(12) United States Patent
Petersen et al.

(10) Patent No.: US 7,730,286 B2
(45) Date of Patent: Jun. 1, 2010

(54) SOFTWARE ASSISTED NESTED HARDWARE TRANSACTIONS

(75) Inventors: Leaf Petersen, San Jose, CA (US); Bratin Saha, San Jose, CA (US); Ali-Reza Adl-tabatabai, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 109 days.

(21) Appl. No.: 11/323,092

(22) Filed: Dec. 30, 2005

(65) Prior Publication Data

US 2007/0162520 A1    Jul. 12, 2007

(51) Int. Cl.
*G06F 9/46* (2006.01)

(52) U.S. Cl. .................. 712/220; 718/101; 711/147; 713/375

(58) Field of Classification Search .................. 712/220; 718/101; 711/147; 713/375
See application file for complete search history.

(56) References Cited

U.S. PATENT DOCUMENTS

| | | | | |
|---|---|---|---|---|
| 5,287,501 | A * | 2/1994 | Lomet ........................ | 707/202 |
| 5,878,206 | A * | 3/1999 | Chen et al. ................... | 714/19 |
| 5,940,839 | A * | 8/1999 | Chen et al. .................. | 707/202 |
| 6,219,666 | B1 * | 4/2001 | Krishnaswamy et al. ........ | 707/8 |
| 6,298,478 | B1 * | 10/2001 | Nally et al. ................. | 717/170 |
| 6,457,065 | B1 * | 9/2002 | Rich et al. .................. | 719/328 |
| 6,463,511 | B2 | 10/2002 | Boatright et al. | |
| 6,574,750 | B1 * | 6/2003 | Felber et al. ................. | 714/20 |
| 6,625,602 | B1 * | 9/2003 | Meredith et al. ............... | 707/8 |
| 6,671,686 | B2 * | 12/2003 | Pardon et al. .................. | 707/8 |
| 6,684,398 | B2 | 1/2004 | Chaudhry et al. | |
| 6,772,296 | B1 * | 8/2004 | Mathiske .................... | 711/138 |
| 6,862,664 | B2 | 3/2005 | Tremblay et al. | |
| 7,185,005 | B1 * | 2/2007 | Long et al. ..................... | 707/4 |
| 7,206,805 | B1 * | 4/2007 | McLaughlin, Jr. .......... | 709/203 |
| 2002/0147890 | A1 * | 10/2002 | Saulsbury et al. ........... | 711/154 |
| 2002/0161815 | A1 * | 10/2002 | Bischof et al. ............. | 709/101 |

(Continued)

OTHER PUBLICATIONS

Theo Haerder, Kurt Rothermel, "Concepts for Transaction Recovery in Nested Transactions", 1987.*
Adl-Tabatabai, et al., U.S. Appl. No. 11/303,529, filed Dec. 15, 2005.
Saha, et al., U.S. Appl. No. 11/305,506, filed Dec. 16, 2005
Saha, et al., U.S. Appl. No. 11/305,634, filed Dec. 16, 2005.

*Primary Examiner*—Aimee J Li
*Assistant Examiner*—Idriss N Alrobaye
(74) *Attorney, Agent, or Firm*—David P. McAbee (57) ABSTRACT

A method and apparatus for efficiently executing nested transactions is herein described. Hardware support for execution of transactions is provided. Additionally, through the use of logging previous values immediately before a current nested transaction in a local memory and storage of a stack of handlers associated with a hierarchy of transactions, nested transactions are potentially efficiently executed. Upon a failure, abort, or invalidating event/access within a nested transaction, the state of variables or memory locations written to during execution of the nested transaction are rolled-back to immediately before the nested transaction, instead of all the way back to an original state of the variables or memory locations before an enclosing transaction. As a result, nested transactions may be re-executed within enclosing transactions, without flattening the enclosing and nested transactions to re-execute everything.

9 Claims, 5 Drawing Sheets

U.S. PATENT DOCUMENTS

| | | |
|---|---|---|
| 2004/0015642 A1 | 1/2004 | Moir et al. |
| 2004/0148316 A1* | 7/2004 | Bridge et al. ............ 707/104.1 |
| 2005/0177831 A1 | 8/2005 | Goodman et al. |
| 2006/0085588 A1 | 4/2006 | Rajwar et al. |
| 2006/0085591 A1 | 4/2006 | Kumar et al. |
| 2006/0122966 A1* | 6/2006 | Fecht et al. .................... 707/2 |

* cited by examiner

SOFTWARE ASSISTED NESTED HARDWARE TRANSACTIONS

FIELD

This invention relates to the field of processor execution and, in particular, to providing for efficient execution of nested transactions.

BACKGROUND

Advances in semi-conductor processing and logic design have permitted an increase in the amount of logic that may be present on integrated circuit devices. As a result, computer system configurations have evolved from a single or multiple integrated circuits in a system to multiple cores and multiple logical processors present on individual integrated circuits. An integrated circuit typically comprises a single processor die, where the processor die may include any number of cores or logical processors.

As an example, a single integrated circuit may have one or multiple cores. The term core usually refers to the ability of logic on an integrated circuit to maintain an independent architecture state, where each independent architecture state is associated with at least some dedicated execution resources. As another example, a single integrated circuit or a single core may have multiple logical processors for executing multiple software threads, which is also referred to as a multi-threading integrated circuit or a multi-threading core. Multiple logical processors usually share common data caches, instruction caches, execution units, branch predictors, control logic, bus interfaces, and other processor resources, while maintaining a unique architecture state for each logical processor The ever increasing number of cores and logical processors on integrated circuits enables more software threads to be executed. However, the increase in the number of software threads that may be executed simultaneously has created problems with synchronizing data shared among the software threads. One common solution to accessing shared data in multiple core or multiple logical processor systems comprises the use of locks to guarantee mutual exclusion across multiple accesses to shared data. However, the ever increasing ability to execute multiple software threads potentially results in false contention and a serialization of execution.

Another solution is using transactional execution to access shared memory to execute instructions and operate on data. Often transactional execution includes speculatively executing a grouping of a plurality of micro-operations, operations, or instructions. During speculative execution of a transaction by a processor, core, or thread, the memory locations read from and written to are tracked to see if another processor, core, or thread accesses those locations. If another thread does alter those locations, the transaction is restarted and it is re-executed from the beginning. Currently, values of memory locations to be changed in a transaction are saved elsewhere, so if the transaction needs to be re-executed the original state of all memory/registers may be restored.

However, as transactional execution has progressed, software programmers have begun to use nested transactions, i.e. a grouping of instructions/operations to be executed within and part of another outer/enclosing group of instructions/operations. As a consequence, current hardware for support for nested transactions has resulted in inefficient execution of nested transactions.

For example, assume an outer transaction and an inner transaction nested within the outer transaction is to be executed. Current hardware support typically saves values of memory locations to be changed before entering the outer transaction. Yet, when executing in the inner transaction, if an abort or invalidating event occurs, the state of memory locations is usually rolled-back to the original state of the memory locations requiring a re-execution of both the outer and inner transaction. This simple example is magnified where more nested transactions exist within each other. Specifically, if an abort occurs within a nested transaction deep in a hierarchy of transactions, numerous nested transactions that were not associated with the abort would have to be re-executed for no reason.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth such as examples of specific hardware support for transactional execution, specific types of local memory in processors, and specific types of memory locations, etc. in order to provide a thorough understanding of the present invention. It will be apparent, however, to one skilled in the art that these specific details need not be employed to practice the present invention. In other instances, well known components or methods, such as coding of transactions in software, demarcation of transactions in hardware, architectures of multi-core and multi-threaded processors, and specific operational details of microprocessors, have not been described in detail in order to avoid unnecessarily obscuring the present invention.

The method and apparatus described herein are for providing software assistance for nested hardware transactions in processors. However, the methods and apparatus for providing software assistance for nested hardware transactions are not so limited, as they may be implemented on or in association with any integrated circuit device or system, such as cell phones, personal digital assistants, embedded controllers, mobile platforms, desktop platforms, and server platforms.

Processors

Figure 1:
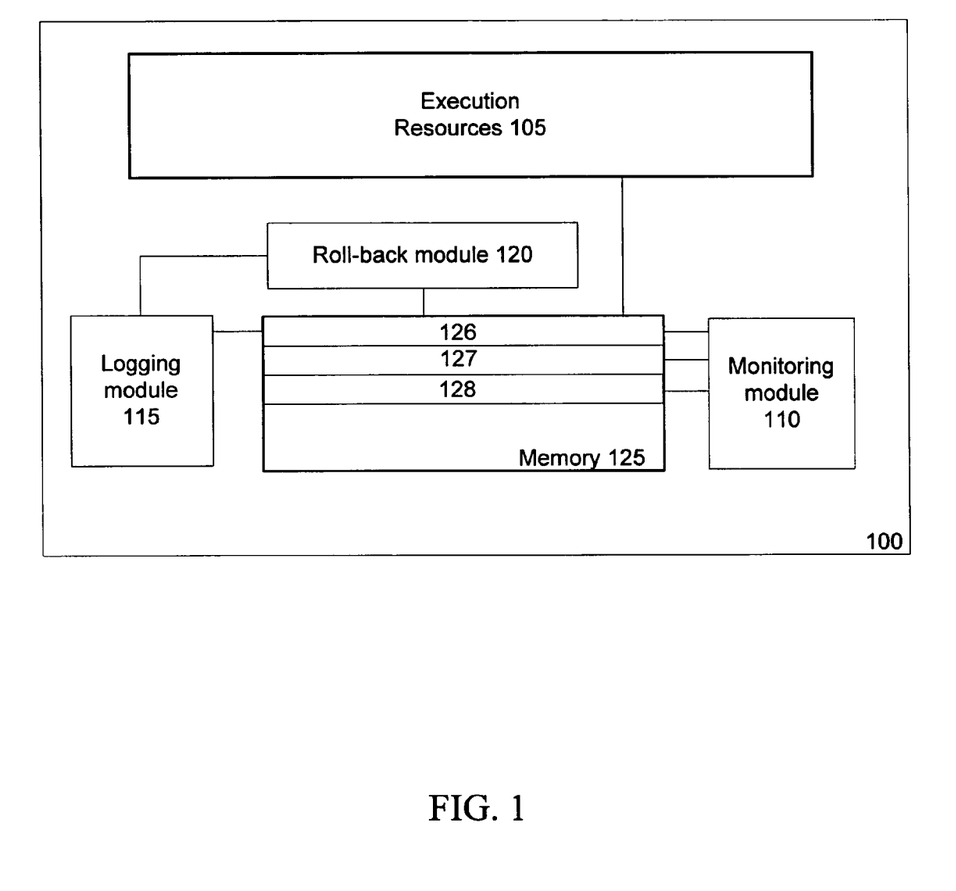
FIG. 1 illustrates an embodiment of a processor to efficiently execute nested transactions.

Referring to FIG. 1, an embodiment of processing element 100, which is capable of transactional execution, is illustrated. Processing element 100 may be any element for executing instructions or operating on data. Examples of processing element 100 include a processor, microprocessor, multi-resource host processor, a microprocessor, a processing core, a logical processor, and an embedded processor, a multi-threaded processor, and a multi-core processor.

In one of the examples, reference to a multi-resource processor is made. Often a resource is referred to as a processor core, logical processor, or threaded processor. Consequently, a multi-resource processor includes a processor with multiple cores, logical processors, threads, or any combination thereof. A core, as used herein, refers to any logic located on an integrated circuit capable to maintain an independent architecture state, wherein each independently maintained architecture state is associated with at least some dedicated execution resources. In contrast, a logical processor typically refers to any logic located on an integrated circuit capable to maintain an independent architecture state, wherein the independently maintained architecture states share access to execution resources Processor 100 may include any combination of cores or threads, such as a multi-core processor where each core supports execution of multiple software threads. Note that processor 100 is capable of individual execution within a system or may be combined with other processing elements in a multiple physical processor system. In one embodiment, to support speculative execution of transactions, processor 100 is capable of speculative execution. Other potential execution capabilities of processor 100 include in-order execution, out-of-order execution, serial execution, parallel execution, fixed point execution, floating-point execution, or other well-known types of execution. Specific examples of execution logic and resources are discussed below in reference to the execution resources section.

Transactions/Invalidating Events

Transactional execution usually includes grouping a plurality of instructions or operations into a transaction or a critical section of code. In some cases, use of the word instruction refers to a macro-instruction which is made up of a plurality of micro-operations. There are commonly two ways to identify transactions. The first example, includes demarcating the transaction in software. Here, some software demarcation is included in code to be identified during execution. In another embodiment, which may be implemented in conjunction with the foregoing software demarcation, transactions are grouped by hardware or recognized by instructions indicating a beginning of a transaction and an end of a transaction. Begin transaction and end transaction instructions are discussed in more detail in reference to FIGS. 4 and 5 below.

In a processor, a transaction is either executed speculatively or non-speculatively. In the second case, a grouping of instructions is executed with some form of lock or guaranteed valid access to shared memory locations to be accessed. In the alternative, speculative execution of a transaction is more common, where a transaction is speculatively executed and only committed upon verification that no invalidating events occurred during execution of the transaction.

An invalidating event refers to an event generated by the system, a user, or another resource, not associated with the execution of the current transaction, that requires re-execution of the transaction or invalidation of the transaction. For example, assume processor 100 is a two-core processor. The first core is executing a transaction accessing shared memory, which includes a read from the shared memory and a write-back to the shared memory. During speculative execution of a current transaction by the first core, if the second core writes to the shared memory location that the first core read from an invalidating event has occurred. The current transaction is invalid, because a shared memory location read from was written to by the second core; therefore, the location read from is potentially bad/outdated data.

Another example includes the write to a shared memory location, where the second core reads from the same memory location. Here, the write is potentially invalid as it invalidates the read the second core just completed. In these examples, the second core was "another resource" not associated with the transaction, such as not assigned to execute the transaction or not executing the transaction, that made an invalidating access.

However, other examples of invalidating events include system generated interrupts, user-generated interrupts, an access by another resource to a memory location to be read from or written to during pendancy of a current transaction, or any other event that cause a manipulation of a shared memory location that a current transaction is reading from or writing to. A current transaction is considered "pending" when it is being executed, i.e. a begin transaction instruction has been executed, but an end transaction has not been executed and the data from the transaction has not been committed or retired. In addition, another resource or other resource is not limited to a core, but may also include a logical processor, a hardware thread, a software thread, as well as another remote agent/resource.

Execution Resources

FIG. 1 also illustrates execution resources 105, which are to execute transactions. Execution resources 105 may also refer to hardware, logic, or modules to support transactional execution. As an example, execution resources 105 are to execute a first transaction and a second transaction nested in the first transaction. A transaction is nested within another transaction, when either in software or hardware, a begin transaction demarcation for an inner transaction is within a transaction demarcation for an outer transaction.

Figure 2:
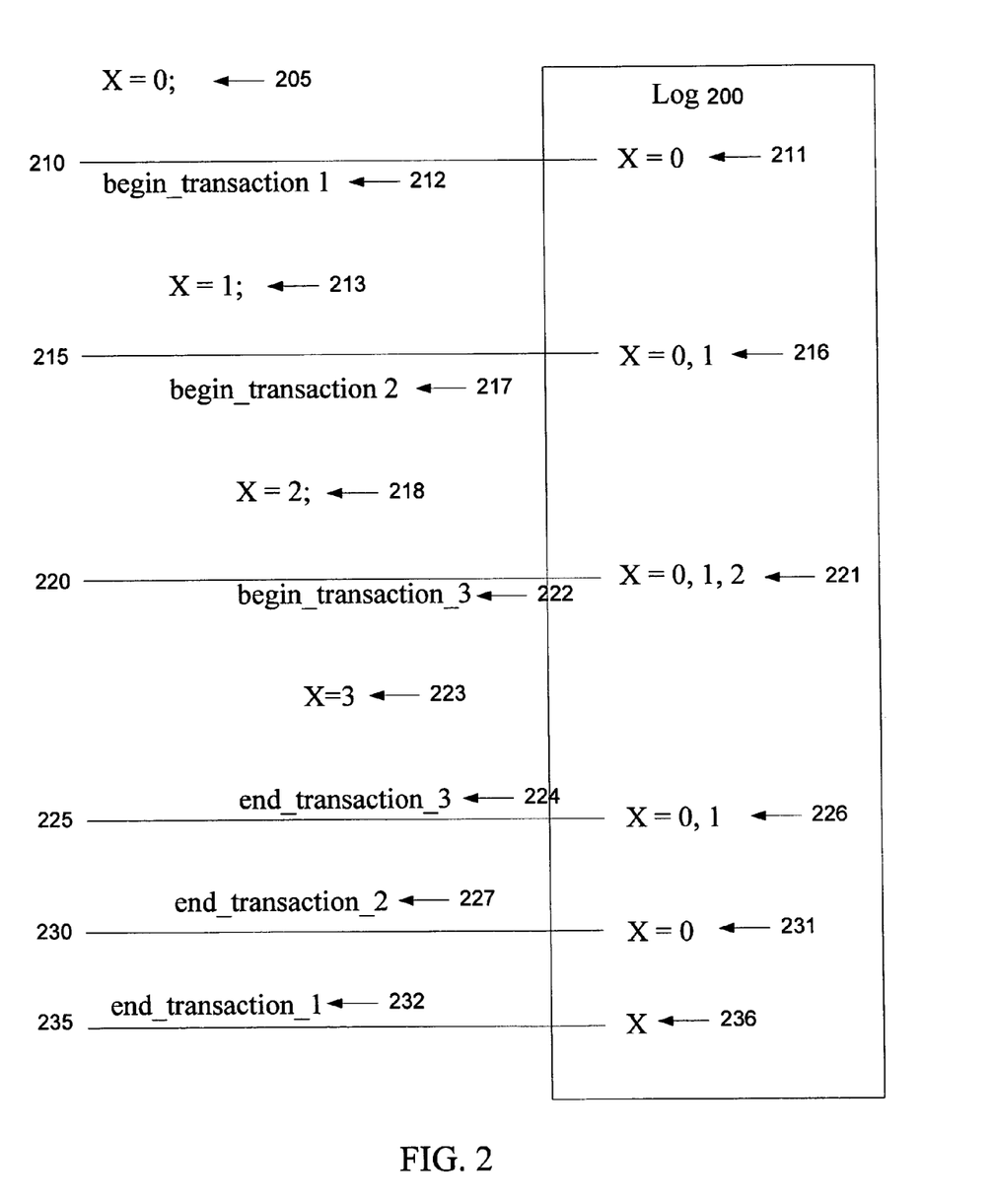
FIG. 2 illustrates an embodiment of a logging module at different points in pseudo-code including nested transactions.

Quickly turning to FIG. 2, an embodiment of pseudo code nested transactions is illustrated. A begin_transaction call identifies either a software construct or a hardware execution of a begin transaction instruction, while an end_transaction call identifies also in software or hardware an end transaction instruction. Here first begin_transaction instruction 212 and first end_transaction instruction 232 illustrates the bounds of a first transaction. Second begin_transaction instruction 217 and second end_transaction instruction 227 outline the bounds a second transaction that is included in the bounds of the first transaction. In other words, the second transaction is nested within the first transaction. FIG. 2 is discussed in more detail below in the logging module section.

Note that a reference to a first and second transaction herein is arbitrary, in that, a first transaction references only a starting point within a hierarchy of nested transactions to view the interplay of operations between an outer transaction and inner transaction nested within an outer transaction. Reference to a first and second transaction does not necessarily refer to a numerical first and second transaction, but rather, may refer to the order/nesting of transactions, i.e. the second within the first. In fact, the first transaction may be a nested transaction, as well as the $100^{th}$ transaction executed in an execution flow. For example, a first transaction may refer to a nested transaction nested three levels down from a top-level transaction, and the second transaction may refer to the fourth level transaction nested within the first transaction.

Referring back to FIG. 1, in one embodiment execution resource 105 includes logic to execute a begin transaction instruction at the start of a transaction, as well as execute an end transaction instruction at the end of a transaction, such as the instructions shown in FIG. 2. Execution resources 105 may also include logic to retire transactions or instructions associated with transactions, as well as logic to buffer writes and commit writes to memory. Other well-known transactional execution resources and logic may also be included. A few examples include logic to detect data conflicts, to buffer speculative updates, to make updates atomically visible at transaction commit, to execute instructions, and to operate on data.

Other common modules, logic, and functional units not illustrated in FIG. 1 may also be included, but are not required to be included, in processor 100, such as any one or any combination of the following: a data path, an instruction path, a virtual memory address translation unit (a translation buffer), an arithmetic logic unit (ALU), a floating point calculation unit capable of executing a single instruction or multiple instructions, as well as capable to operate on single or multiple data operands in serial or in parallel, a register, an interrupt controller, an advanced programmable interrupt controller (APIC), a pre-fetch unit, a fetch unit, a decode unit, a cache, an instruction retirement unit, an instruction re-order unit, and any other logic that is be used for fetching, executing, or operating on instructions and/or data.

Memory

Memory 125 includes any memory location to be accessed by execution resources 105, processing resources, such as cores, logical processors, or threads. In one embodiment, memory 125 is a shared memory shared by at least one other processing resource, such as a core, thread, logical processor, or remote agent. Examples of memory 125 include a cache, a plurality of registers, a register file, a static random access memory (SRAM), a plurality of latches, or other storage element. Note that processor 100 or any processing resources on processor 100 may be addressing a system memory location, a virtual memory address, a physical address, or other address when reading from or writing to a memory location. Memory 125 will be discussed in more detail in reference to the exemplary embodiments below, when discussing memory location to be written to or read from, states of memory locations, or rolling-back/restoring states/values of memory locations.

As a specific illustrative example, assume that memory 125 is a cache memory, such as a trace cache, a first-level cache, a second-level cache, or a higher-level cache. Cache 125 includes cache lines 126, 127, and 128, which may also be referred to as memory locations within memory 125. As another example, assume memory 125 is a plurality of registers used by a processing element or resource as execution space or scratch pad to store variables, instructions, or data. Memory locations in grouping of registers 125 are registers 126, 127, and 128, in this example.

Monitor Module

In FIG. 1, monitoring module 110 is illustrated coupled to memory 125; however, monitor module 110 may be wholly or partially implemented in memory 125, as well as implemented elsewhere in processor 100. A module may be implemented in hardware, software, firmware, or any combination thereof. Commonly, module boundaries vary and functions are implemented together, as well as separately in different embodiments. As an example, which is discussed in more detail below, a cache coherency protocol is used to monitor/track invalidating accesses to memory 125, where bits in the cache are used to represent invalidating accesses and other hardware, software, or firmware determines that an invalidating event has occurred based on the value of those bits. Here, monitoring module varies across boundaries, as parts are implemented in memory 125, as well as in other hardware or firmware in processor 100, as well as software executed on processor 100.

Monitoring module 110 is to detect an invalidating event during execution of a transaction. In one embodiment, monitor module 110 is part of the hardware support for executing transactions, as discussed above. Here, monitor module 110 is implemented in hardware to detect/monitor invalidating accesses to locations memory 125 to be changed/written to during execution of a transaction. As stated above an invalidating event refers to an event generated by the system, a user, or another resource, not associated with the execution of the current transaction, that requires re-execution of the transaction or invalidation of the transaction. For example, assume a current transaction writes to memory locations 126 and 127. A write to memory location 126 or 127 by another resource is monitored/detected by monitoring module 110 as an invalidating access.

As a first example, monitoring module 110 includes a cache coherency protocol to detect invalidating accesses to memory 125. In one embodiment of a cache coherency protocol there is a bit/flag for every line of the cache/memory location, such as lines 126-128, to represent if an invalidating access occurred to a corresponding memory location during execution of a transaction.

To simplify the example, assume that a transaction is executing and is to write to line 127 of cache 125. If a predetermined flag/bit in cache line 127 or a bit/flag associated with cache line 127 represents a first logical value, such as a high logical value, then there has been no invalidating access. However, upon an access to cache line 127 that would invalidate the current transaction, the flag/bit is flipped to represent that an invalidating access has occurred. Essentially, monitoring module 110 has detected an invalidating access and represented that in cache 125. Detecting of an invalidating access may include any known-method, such as comparing a resource ID, such as a thread ID or core ID, with that of the ID executing the current transaction.

Note that specific reference to a high logical value for one implementation was used in the example above; however, conversely, a low logic level may represent that there was no invalidating access. Often, the use of logic levels or logical values is also referred to as 1's and 0's, which simply represents binary logic states. For example, a 1 refers to a high logic level and 0 refers to a low logic level. In many older systems a high voltage level was represented by a voltage, e.g. 5V, and a low voltage level, e.g. 0V. As another specific example, a high logic level is at 1.2V and a low logic level is at 0.3V. However, a high logic/voltage level may refer to any voltage level above a threshold value, and inversely, a low logic level may refer to any voltage level below the threshold value. In addition, there may be more than two logical levels in a cell or waveform. As an example, a single waveform may represent four different logical values at different voltage levels.

Other methods of using hardware or software to monitor/track invalidating accesses to a memory, such as memory 125 may be used. One example of tracking invalidating accesses using at least in part tracking logic, such as an advanced load address table (ALAT), is discussed in, "Transaction based shared data operations in a multiprocessor environment," with Ser. No. 11/027,623. Other standard hardware support may also be used. Two examples of standard hardware support for transactions are discussed in the following articles: (1) "Transactional Memory: Architectural support for lock-free data structures," by Maurice Herlihy and J. Eliot B. Moss and in "Proceedings of the 20th Annual International Symposium on Computer Architecture," May 1993, pp. 289-300; (2) "Virtualizing Transactional Memory," by Ravi Rajwar and Maurice Herlihy and Konrad Lai in "Proceedings of the 32nd Annual International Symposium on Computer Architecture," June 2005, pp. 494-505.

Logging Module

Also illustrated in FIG. 1 is logging module 115 and roll-back module 120, which may be implemented together, separately, or vary across each other's boundaries. As stated above, a module may be implemented in hardware, software, firmware, or any combination thereof. Commonly, module boundaries vary and functions are implemented together, as well as separately in different embodiments. Logging module is to take a snapshot of values in memory, record states of memory locations, store handlers, store stacks of values in memory, store stacks of abort handlers, and/or perform other functions to enable roll-back/restore of memory locations to values immediately preceding a nested transaction.

Turning to FIG. 2, an embodiment of a log at different points in pseudo-code is illustrated. FIG. 2 illustrates pseudo code on the left, and at checkpoints through the pseudo code, such as checkpoints 210, 215, 220, 225, 230, and 235, log 200's operation is illustrated. At the highest level, instruction 205 is shown, i.e. X=0, which represents a store, write, or other representation of setting a memory location X or a memory location referenced by address X to a simple numerical value, 0. In addition, further calls to variable, address, or memory location X operate in a similar manner. As stated above, X may be any memory location such as a cache location, register, variable space, system memory, etc.

First, it is worth noting that a first transaction, which is a top-level transaction as it is not nested within another transaction, begins at begi_transaction_1 instruction 212 and ends at end_transaction_1 instruction 232. Consequently, a second transaction, which is a nested transaction being within the bounds of the first transaction, starts at begin_transaction_2 217 and ends at end_transaction_2 227. Finally, a third transaction, which is nested within the second transaction, starts at begin_transaction_3 222 instruction and ends at end_transaction_3 instruction 224. Labeling of begin and end of transactions is shown as separate instructions with different reference numerals to illustrate that matching of the beginning and ending of transactions. However, begin_transaction_1 instruction 212, begin_transaction_2 instruction 217, begin_transaction_3 instruction 232 may be the same instruction to be executed at three different periods of time during execution. The same applies to the end_transaction instructions.

Starting at line 205 memory location X gets a value 0. At checkpoint 210, before entering the first transaction, there are two options to begin logging. In a first option, where all addresses written to/changed are enumerated, i.e. known, then log 200 stores a first set of values/takes a snapshot of memory locations, such as X, to be changed in the first transaction. Here, before entering the first transaction or at the start of the transaction before executing a first instruction in the transaction, the current value/snapshot of memory location X is taken and stored in log 200, as represented by entry 211 including X=0.

As a second option, where not all addresses to be written to are known, executing of the first transaction begins, and during the transaction but immediately before changing/writing to a memory location, the snapshot or storing of a state of the memory location to be changed/written to is then stored in entry 211.

Therefore, upon execution of the first transaction, if an abort, failure, or invalidating access occurs, the memory location X that was changed is able to be rolled-back/restored to its original state immediately before the first transaction from entry 211 in log 200. However, assuming execution continues to checkpoint 215 memory location X now has a value of 1 from operation/execution of instruction 213. Now, in one embodiment a logging module, which includes log 200, is to take a second-level snapshot of a second-level value in a memory location to be changed during execution of the second transaction.

To illustrate, assume that the program flow is at checkpoint 215, before entering the second transaction, which is at a second-level and nested within the first transaction. At this point there the same two options for logging exist: (1) log before any locations are written to or (2) log as execution goes along immediately before any writes. Here, the second-level value is the value written to X at line/instruction 213, as it is the value at the same level as the second transaction. The second transaction is at a second-level as it is nested within another transaction, which is deemed the first-level. As a result, a second-level snapshot of a second-level value, i.e. 1 from line 213, in a memory location to be changed during execution of the second transaction, such as X which is changed/written to in line 218. Here, the second level-snapshot includes the storing of the second-level value, 1, in log 200, which is seen at entry 216.

It is worth noting at this point, that log 200 may be implemented in any manner to track values, such as regular storage in a stack configuration. In this example, the second-level value of 1 is stacked on the first-level value of 0. To illustrate this functionality, assume an abort occurs at line 218. Instead of previous transactional execution that would flatten nested transactions and restore X to its first-level original state of 0, the state of X is able to be rolled-back to just checkpoint 215 where X has a value of 1, from the assistance of log 200. Additionally, if execution had to be rolled back again to checkpoint 210 and the value 1 had been popped off a stack configuration to roll-back previously, then the state of X may further be rolled-back to 0 at checkpoint 210 based on log 200.

It should also be apparent that reference to a first transaction and a second transaction nested within a first transaction does not necessarily refer to a top-level transaction, such as the first transaction in FIG. 2, and the second transaction does not necessarily refer to the first nested transaction, as in FIG. 2. For example, a first transaction may be the second transaction in FIG. 2, which is a nested transaction already, while the second transaction nested within the first transaction may be the third transaction that is nested in the second transaction of FIG. 2. Basically, the first and second transaction may be viewed at any level in a hierarchy of nested transactions.

Continuing the example, from above, assume that execution has continued to checkpoint 220. At this point, the third transaction is a current-level transaction or an inner transaction, while the second transaction is the outer transaction, enclosing transaction, or previous-level transaction. Once again, X is to be changed in the inner-level transaction, so a state of the previous-level or second-level memory location to be changed during execution of the transaction is stored in log 200. Here, X has a value of 2, so the value 2 is pushed onto a stack in entry 221 including 0, 1, and 2. Similarly, if an abort occurs at this point, memory location X is restored to the previous-level value of 2 and the third transaction may be re-executed without re-executing both the first and second transactions.

Upon end-transaction_3 instruction 224 when the third transaction is to be ended, retired, and/or committed a write log is merged into the write log of the enclosing or previous level transaction. In the embodiment above, values were appended or popped onto the entries store in log 200. As a result upon executing an end_transaction instruction, the nested transaction is to be committed, so the log pops, merges, or removes the value appended for the current-level transaction that is being ended. Therefore, upon an abort at this point the second transaction is able to be re-executed and the original state of the memory location X is able to be restored from the log to the value before entering the second transaction of 1. This embodiment is illustrated in entry 226.

However, any other implementation of storing the values may be used. In fact, an implementation is tailored to an abort handler that rolls-back or restores the values, as discussed below. Similar merging operations are done at checkpoints 230 and 235, as illustrated in entries 231 and 236, respectively.

Returning to FIG. 1 briefly, roll-back module 120 is illustrated and is to roll-back the memory location to the second-level snapshot, upon the monitor module detecting an invalidating event during execution of the second transaction. In the example, above it is apparent, that roll-back module 120 restores values of memory locations to be changed during execution of a nested transaction to their states immediately before executing the nested transaction. Examples of roll-back module 120 are discussed below in reference to default handlers and abort handlers.

Figure 3:
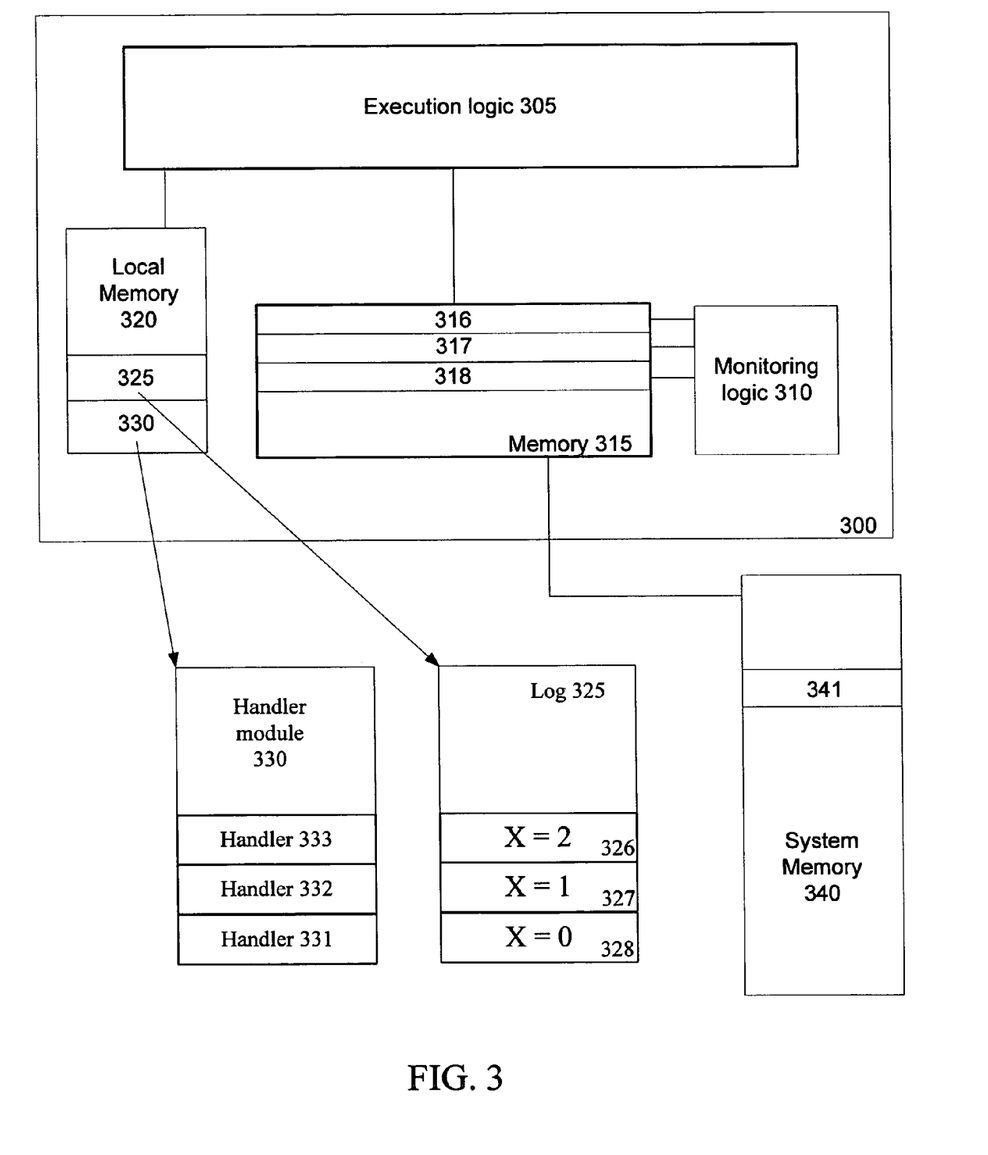
FIG. 3 illustrates another embodiment of a processor to efficiently execute nested transactions.

Turning over to FIG. 3, an embodiment of a processor to efficiently execute nested transactions is illustrated. Similar to FIG. 1, processor 300 includes execution logic 305, memory 315 including memory locations 316, and monitoring logic 310. In one embodiment, processor 300 is a multi-resource processor, such as a multi-core, multi-threaded, or multi-logical processor with monitoring logic 310 including cache coherency logic. However, any of the foregoing examples of a processor and its contents may be included in processor 300.

In addition, processor 300 includes local memory 320. Local memory 320 includes any memory associated with processor 320. In one embodiment, local memory consists of memory that is only accessible by one processor or one processing resource; however, local memory is not so limited. In another embodiment local memory includes a globally shared memory that is partitioned among processors or resources. In this case, a thread Id, core Id, or other way of identifying a resource is used to allow access to a section of memory, and inversely, to deny access to other resources not assigned to the section of memory. Specific examples of local memory 320 include a Random Access Memory (RAM), a Static RAM (SRAM), a Dynamic RAM (DRAM), a plurality of registers, a plurality of latches, a cache, or any storage element in processor 300.

In one embodiment, log 325 is illustrated stored in local memory 320. As an example, log 325 operates in a similar manner to log 200 illustrated in FIG. 2. In this case, notice that log 325 illustrates the state of log 200 at entry 220 in a stack format. Assuming that operation is at checkpoint 220 in FIG. 2, the third nested transaction is the current-level transaction and the second transaction is the previous-level transaction. Therefore, upon an invalidating event occurring during execution of the current-level transaction, the memory location to be changed during execution of the current-level transaction, i.e. memory location X, is restored to the previous-level value/state of 2, which is on the top of the stack in log 325 at entry 326.

Moreover, handler module 330, which may also be referred to as a roll-back module, is shown stored in local memory 320, but as illustrated in FIG. 1 handler module 330 may be stored in other memory or implemented in other logic/modules of processor 300. Handler module 330 is to restore the memory locations to be written to during execution of a second transaction nested within a first transaction to a second set of values or a plurality of previous-level values logged before writing to the memory locations to be written to, if an invalidating access occurs during execution of the second transaction.

A specific simplified embodiment of handler module 330 is discussed to illustrate its potential operation. Upon an invalidating access/event occurring during execution of a nested transaction, a default handler is initially invoked/executed. A default handler, although not specifically depicted, may be stored in local memory 320, memory 315, system memory 340, or other memory in processor 300 not depicted. A default handler is to transfer control of processor 300 to an abort handler associated with the current-level transaction, if an invalidating access occurs during execution of the current level-transaction.

For example, assume that upon execution of the first transaction in FIG. 2, an abort handler associated with the first transaction, such as abort handler 331 in FIG. 3, is pushed onto a stack of abort handlers, as in handler module 330. In addition, a first set of values of memory locations to be written to during execution of the first transaction are stored in log 325, which in this case includes only memory location X getting a value 0 in entry 328 of log 325. Next, upon entering the second transaction in FIG. 2, second abort handler 332 associated with the second transaction is pushed onto handler module 330's stack and a second set of values is logged in entry 327, i.e. second/previous-level value 1, for X.

Now assume, that an invalidating access or event occurs during execution of the second transaction. The default handler, when executed, is to initiate execution and/or control to the top abort handler on the stack, which is abort handler 332 that is associated with the second transaction. Abort handler 332, when executed by the execution unit, is to restore memory location X to the previous-level, i.e. the second set of values, logged in log 325. At this point the value 1 is at the top of the stack and is loaded into memory location X by abort handler 332 to allow for re-execution of the second nested transaction.

However, if normal execution were to continue, then upon entering the third transaction in FIG. 2, abort handler 333 associated with the third transaction is pushed onto the handler stack and previous-level value 326 is pushed onto log 325's stack.

An Embodiment of a System

Referring still to FIG. 3, an embodiment of a system is illustrated. Processor 300 is coupled to system memory 340. Although not shown, system memory 340 may be coupled to processor 300 through other components or devices, such as a memory controller hub. System memory includes any memory for storage in a system such as a SRAM, DRAM, double data rate (DDR) RAM, non-volatile (NV) RAM, EDO RAM, or other memory device. System memory 340 is to store elements, such as instructions and data operands to be executed by processor 300. In one embodiment, system memory stores a plurality of instructions that are to be grouped into transactions, such as a first transaction and a second transaction to be nested in the first transaction.

An Embodiment of a Method for Executing a Nested Transaction

Figure 4:
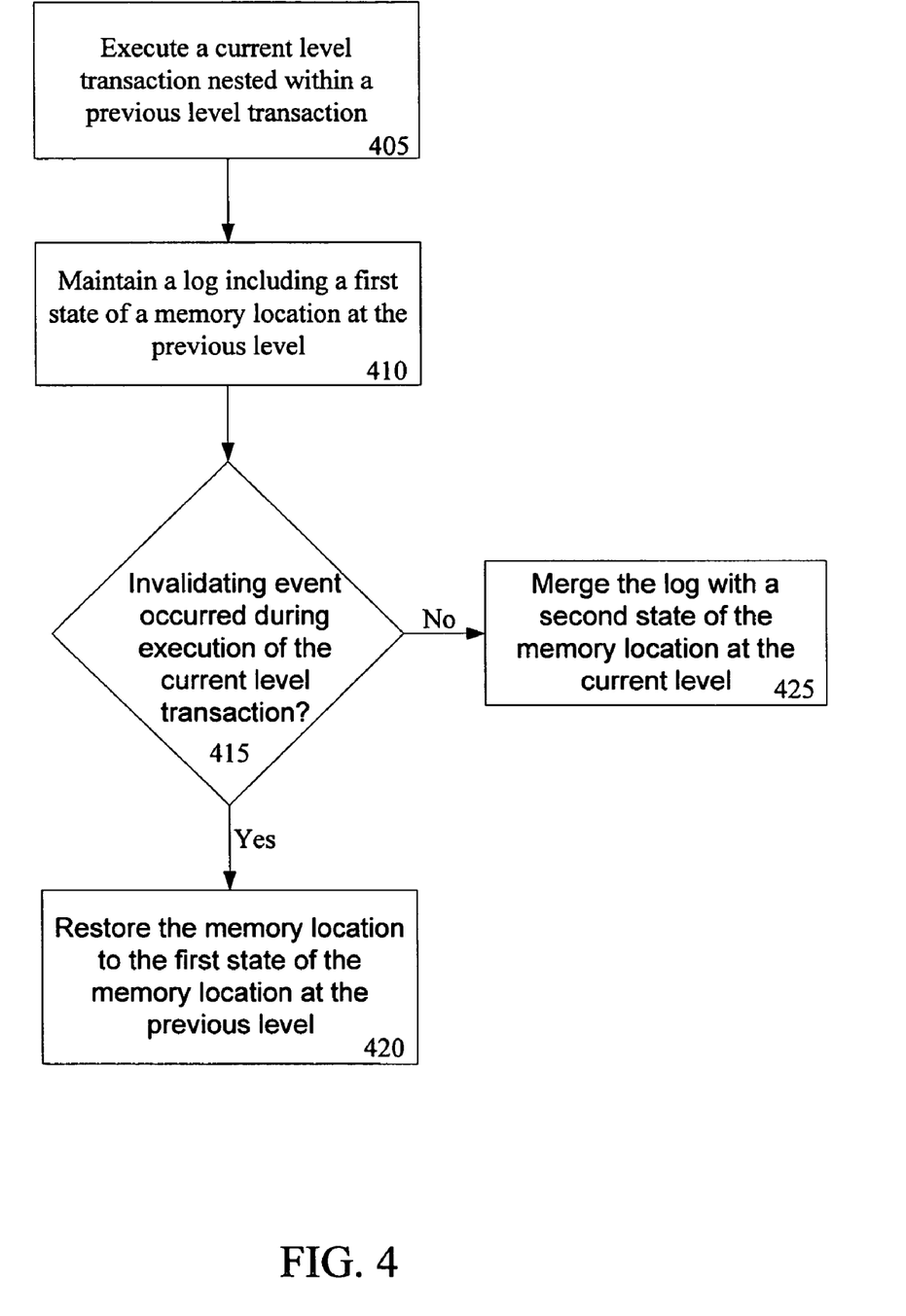
FIG. 4 illustrates an embodiment of a flow diagram for executing a current level nested transactions within a previous level transaction.

Turning to FIG. 4, an embodiment of a flow diagram for a method of executing a current level transaction nested within a previous level transaction is illustrated. In flow 405, a current level transaction nested within a previous-level transaction is executed. Here, as above, a begin transaction instruction or demarcation may establish the starting points of both the current level and previous level transactions. In one embodiment, the transaction is executed with hardware support for determining bounds of transaction, detecting data conflicts, and other hardware support functions mentioned above.

In flow 410 a log including a first state of a memory location at the previous level, which is to be written to during execution of the current-level transaction, is maintained. Although, the flow diagram in FIG. 4, illustrates an arrowed flow, the flows shown, such as flow 410 and 405 may occur in any order. As stated above, storing to the log may be done either before entering and executing the transaction, as well as during execution of the transaction and immediately before the memory location to be written to is changed, written to, or a write to is buffered. As illustrated, in the foregoing examples, the log may be stored in a local memory.

In one embodiment, local memory also maintains a stack of a first abort handler associated with the current level transaction stacked on a second abort handler associated with the previous level transaction. Similar in operation, to handler module 330 in FIG. 3, a stack or other general configuration of abort handlers is stored in local memory. In another embodiment, the stack of handlers is stored in a different memory at random locations, not in a stack configuration. In this case, a group of pointers or other association device associates the handlers with their respective transaction.

In decision box 415, it is determined if an invalidating event occurs during execution of the current level transaction. Examples of invalidating events are discussed above, in the transactions/invalidating events sections. In one embodiment, a cache coherency protocol or other hardware support is used to determine if the invalidating event occurs during execution of the current-level transaction.

In flow 420, the memory location is restored to the first state of the memory location at the previous level, if an invalidating event is detected during execution of the current level transaction. As an example restoring includes popping the first abort handler off the stack, transferring control to the first abort handler, executing the first abort handler, wherein upon execution, the first abort handler restores the memory location with the first state of the memory location maintained in the log.

Finally, in flow 425, the log is merged with a second state of the memory location at the current level, if no invalidating event occurs during execution of the current level transaction. In a first embodiment, merging includes appending the second state on the end of the log. In another example, merging may include discarding the last log entry to ensure a potential abort within the previous-level transaction is correctly rolled-back to an original state before its execution. In addition, upon committing or ending the previous-level transaction the log may be discarded completely, if the previous-level transaction is a top-level transaction, which is not nested within another transaction.

Another Embodiment of a Method for Executing a Nested Transaction

Figure 5:
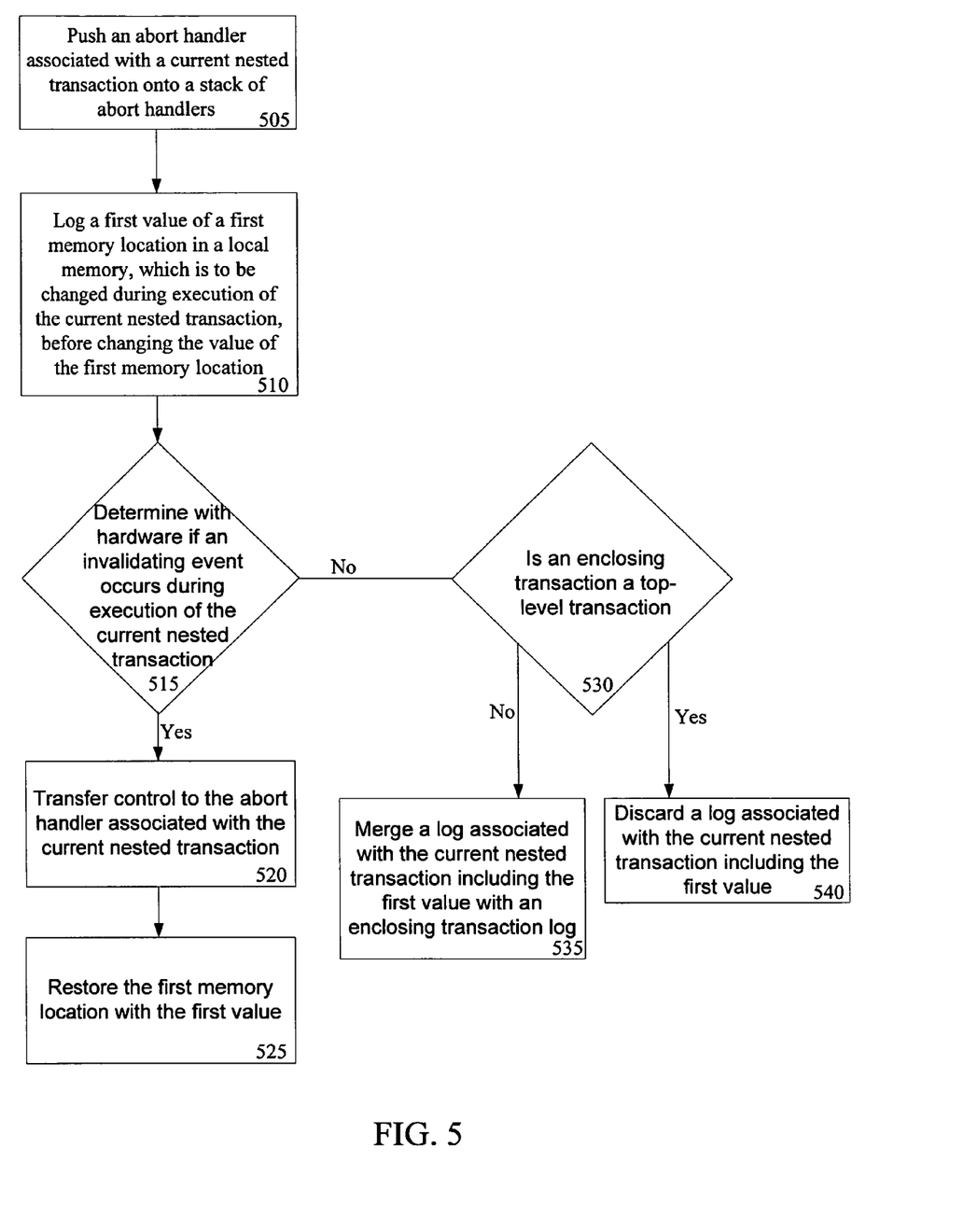
FIG. 5 illustrates an embodiment of a flow diagram for executing a nested transaction.

Turning finally to FIG. 5, another embodiment of a flow diagram for a method of executing a nested transaction is illustrated. In flow 505, an abort handler associated with a current nested transaction is pushed onto a stack of abort handlers. In one embodiment, the stack of abort handlers is stored in a local memory.

In flow 510, a first value of a first memory location, which is to be changed during execution of the current nested transaction, is logged in a local memory before changing the value of the first memory location. As a first example, logging a first value of the first memory location includes storing/logging the first value of the first memory location in a local memory before executing a first instruction in the current nested transaction. In another embodiment, logging a first value of the first memory locations includes storing/logging the first value of the first memory location in a local memory during execution of the current execution and immediately before the first memory location is changed/written to.

In decision box 515, it is determined with hardware if an invalidating event occurs during execution of the current nested transaction. In an illustrative example, a functional unit of a microprocessor such as a cache, an advanced load address table (ALAT), and invalidating access tracking unit is at least partially used to determine if an invaliding event occurs during execution of the current nested transaction. A cache coherency protocol or other hardware based protocol may also be used.

In flow 520 and 525, control is transferred to the abort handler associated with the current nested transaction and the first memory location is restored with the first value, if an invalidating event occurs during execution of the current nested transaction. In one embodiment, control is transferred by execution of a default handler to pop the abort handler associated with the current nested transaction off the stack of handlers to be executed by a processor. Restoring the location includes writing the first value to the first memory location before re-execution of the current transaction. The abort handler associated with the current transaction may accomplish this, when executed.

In decision box, 530 it is determined if an enclosing transaction is a top-level transaction, if no invalidating event occurs during execution of the current nested transaction. Essentially, here, the transaction is ended successfully with no invalidating access or event, such as a write or interrupt. If the transaction is not an enclosing transaction, but rather a nested transaction, a log associated with the current nested transaction including the first value is merged with an enclosing transaction log. In contrast, if the transaction is an enclosing transaction then a log associated with the current nested transaction including the first value is discarded.

As illustrated above, nested transaction may be executed efficiently. Previous nested transaction execution, typically, flattened the nested transaction. As a result, in a nested transaction hierarchy, like the transactions shown in FIG. 2, if there was a failure, abort, or invalidating access during execution of the third transaction, then both the first and the second transaction would also have to be re-executed. However, by providing hardware support of the execution of transactions, and assistance through modules such as a logging module and handler module, only the failed third transaction is potentially re-executed, which saves precious execution time and allows for efficient execution of nested transactions.

The embodiments of methods, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical, optical, acoustical or other form of propagated signals (e.g., carrier waves, infrared signals, digital signals); etc.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
a multi-resource processor including execution logic to speculatively execute a second transaction nested within a first transaction;
a memory associated with the processor to hold a first set of values from a first set memory locations of the shared memory to be speculatively modified during execution of the first transaction, and a second set of values from a second set of memory locations of the shared memory to be speculatively modified during execution of the second transaction, wherein the memory is further to hold in a stack to include a reference to second abort handler code associated with the second transaction stacked on a reference to first abort handler code associated with the first transaction;
a hardware monitor determine if an invalidating access to the second set of memory locations occurs during a pendancy of the second transaction;
wherein the processor is to pop the reference to the second abort handler code off the stack in response to the hardware monitor determining an invalidating access to the second set of memory locations occurred during the pendancy of the second transaction and execute the second abort handler code to restore the second set of values back to the second set of memory locations.

2. The apparatus of claim 1, wherein the processor is also to pop the reference to the first abort handler code off the stack in response to the hardware monitor determining an invalidating access to the first set of memory locations occurred during the pendancy of the first transaction and to execute the first abort handler code associated with the first transaction to restore the first set of values back to the first set of memory locations.

3. The apparatus of claim 1, wherein software is to maintain the first set of values and the second set of values to be held in the memory and is also to maintain the stack to include the reference to the first abort handler code stacked on the reference to the second abort handler code.

4. The apparatus of claim 1, wherein the processor further includes a cache memory to be shared by multiple resources of the multi-resource processor, the first transaction is to include a first plurality of instructions to be decoded into a second plurality of micro-operations, and wherein the second transaction is to include a third plurality of instructions to be decoded into a fourth plurality of micro-operations.

5. The apparatus of claim 1, wherein the memory is included within the processor and hardware is to manage the second set of values held in the stack configuration on the first set of values.

6. A machine readable storage medium including program code which, when executed by a machine, causes the machine to perform the operations of: executing a current level critical section of code nested within a previous level critical section of code on a processor, wherein the machine is to include monitor hardware capable of detecting a transactional conflict associated with the current level critical section of code;
maintaining a data stack to hold a current checkpoint value of a cache memory location, which is to be modified in the current level critical section of code, and a previous checkpoint value of the cache memory location, which is to be modified in the previous level critical section of code;
maintaining a handler stack to hold a reference to a current abort handler associated with the current level critical section of code stacked on a reference to a previous abort handler associated with the previous level critical section of code;
executing the current abort handler code to restore the current checkpoint value to the cache memory location in response to the monitor hardware detecting a transactional conflict associated with the current level critical section of code; and
removing the current checkpoint value from the data stack and the reference to the current abort handler from the handler stack in response to committing the current level critical section of code.

7. The machine readable storage medium of claim 6, wherein the data stack and the handler stack are the same stack, which is held in a local memory in a microprocessor included in the machine.

8. The machine readable storage medium of claim 6, wherein the program code, when executed by the machine, is further to cause the machine to perform the operations of determining an abort of the current level critical section of code is to be performed, wherein executing the current abort handler code to restore the current checkpoint value to the cache memory location in response to the monitor hardware detecting a transactional conflict associated with the current level critical section of code comprises executing the current abort handler code to restore the current checkpoint value to the cache memory location in responsive to determining the abort of the current level critical section of codes is to be performed based on the monitor hardware detecting a transactional conflict associated with the current level critical section of code.

9. The machine readable storage medium of claim 6, wherein executing the current abort handler code to restore the current checkpoint value to the cache memory location comprises:
popping the reference to the current abort handler off the stack;
transferring control to the current abort handler based on the reference to the current abort handler popped off the stack;
executing the current abort handler to write the current checkpoint value to the cache memory location.

* * * * *